US009804965B2

United States Patent
Kim et al.

(10) Patent No.: US 9,804,965 B2
(45) Date of Patent: Oct. 31, 2017

(54) VIRTUAL MACHINE HOST SERVER APPARATUS AND METHOD FOR OPERATING THE SAME

(71) Applicant: Electronics and Telecommunications Research Institute, Daejeon (KR)

(72) Inventors: Young Chang Kim, Daejeon (KR); Ki Sung Jin, Daejeon (KR); Young Kyun Kim, Daejeon (KR); Hong Yeon Kim, Daejeon (KR); Wan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 27 days.

(21) Appl. No.: 14/848,841

(22) Filed: Sep. 9, 2015

(65) Prior Publication Data
US 2016/0162409 A1 Jun. 9, 2016

(30) Foreign Application Priority Data

Dec. 3, 2014 (KR) .................. 10-2014-0172395
Jun. 15, 2015 (KR) .................. 10-2015-0084491

(51) Int. Cl.
*G06F 12/08* (2016.01)
*G06F 12/0862* (2016.01)
(Continued)

(52) U.S. Cl.
CPC ........ *G06F 12/0862* (2013.01); *G06F 9/4401* (2013.01); *G06F 9/45558* (2013.01);
(Continued)

(58) Field of Classification Search
CPC ............... G06F 12/0862; G06F 9/4401; G06F 9/45558; G06F 2007/45579; G06F 2210/6026
See application file for complete search history.

(56) References Cited

U.S. PATENT DOCUMENTS 8,087,017 B1 * 12/2011 Whaley .................. G06F 21/64
713/187
8,954,960 B2 * 2/2015 Ogawa .................. G06F 13/385
709/201

(Continued)

FOREIGN PATENT DOCUMENTS

JP          5477660 B2      4/2014
KR       10-1212273 B1     12/2012
KR     10-2015-0087990 A    7/2015

OTHER PUBLICATIONS

Tang C. FVD: A High-Performance Virtual Machine Image Format for Cloud. InUSENIX Annual Technical Conference Jun. 15, 2011.*

*Primary Examiner* — David X Yi
*Assistant Examiner* — Ramon A Mercado
(74) *Attorney, Agent, or Firm* — Nelson Mullins Riley & Scarborough LLP; Anthony A. Laurentano

(57) ABSTRACT

A virtual machine host server includes a virtual machine in which a guest operating system is installed and operated, a cache manager for processing at least one of an open request, a close request, and an input/output request for a disk image file of the virtual machine, which is stored in a storage system, and managing a boot workload map and a boot segment, a cache device for caching the boot segment, and a prefetch manager for prefetching the boot segment from the cache device.

6 Claims, 5 Drawing Sheets

(51) Int. Cl.
 *G06F 9/44* (2006.01)
 *G06F 9/455* (2006.01)
(52) U.S. Cl.
 CPC ............ *G06F 2009/45579* (2013.01); *G06F 2212/6026* (2013.01)

(56) References Cited

U.S. PATENT DOCUMENTS

| | | | | |
|---|---|---|---|---|
| 2005/0289246 | A1* | 12/2005 | Easton | G06F 12/109 710/1 |
| 2010/0070678 | A1* | 3/2010 | Zhang | G06F 9/461 711/6 |
| 2012/0066677 | A1* | 3/2012 | Tang | G06F 9/4856 718/1 |
| 2012/0144182 | A1* | 6/2012 | Nam | G06F 9/4401 713/2 |
| 2012/0167086 | A1* | 6/2012 | Lee | G06F 9/45504 718/1 |
| 2014/0297998 | A1 | 10/2014 | Kang | |

* cited by examiner

VIRTUAL MACHINE HOST SERVER APPARATUS AND METHOD FOR OPERATING THE SAME

CROSS-REFERENCE TO RELATED APPLICATIONS

The present application claims priority to and the benefit of Korean Patent Application Numbers 10-2014-0172395 filed on Dec. 3, 2014 and 10-2015-0084491 filed on Jun. 15, 2015, in the Korean Intellectual Property Office, the entire disclosure of which is incorporated by reference herein.

BACKGROUND

1. Field

An aspect of the present disclosure relates to a virtual machine host server apparatus, and more particularly, to a virtual machine host server apparatus for accelerating booting performance of a virtual machine in an environment in which a virtual machine host server having the virtual machine operated therein and a storage system for storing virtual machine data are connected to each other through a network.

2. Description of the Related Art

According to a conventional art, disk image data of a virtual machine in a virtual machine environment was not stored in a local storage of a virtual machine host server having the virtual machine operated therein but stored in a storage system connected to the virtual machine host server through a network, and input/output of the disk image data was performed using the storage system. Thus, the disk input/output performance according to the operation of the virtual machine converges to the performance of the network and the input/output performance of the storage system. However, according to an input/output workload generated in booting of the virtual machine, most requests for a file having the disk image data stored therein after the booting of the virtual machine are read requests in a sector unit of 512 bytes, and particularly, random reads occupy most of the read requests. Therefore, the booting performance of the virtual machine is degraded due to a network delay time and a disk random read in the storage system.

Accordingly, there was an attempt to detect a virtual machine completely duplicated in a template, load the template in a cache, track data blocks changed in a disk image file of the duplicated virtual machine, and process a read request for unchanged data blocks by reading the unchanged data blocks from the disk image file of the template loaded in the cache, thereby improving the performance of disk input/output generated during operation of the virtual machine. However, the conventional art is limitedly applicable to the completely duplicated virtual machine. Since the entire disk image file of the template is loaded in the cache without considering blocks accessed in the booting of the virtual machine, it is highly likely that data accessed in the booting of the virtual machine will not exist in the cache at a point of time when the data is requested. In addition, when a cache miss occurs, the booting performance of the virtual machine is degraded due to a random read in the sector unit of 512 bytes, which mostly occupies a boot workload.

SUMMARY

Embodiments provide a virtual machine host server apparatus for accelerating booting performance of a virtual machine in an environment in which a virtual machine host server having the virtual machine operated therein and a storage system for storing virtual machine data are connected to each other through a network.

According to an aspect of the present disclosure, there is provided a virtual machine host server, including: a virtual machine in which a guest operating system is installed and operated; a cache manager configured to process at least one of an open request, a close request, and an input/output request for a disk image file of the virtual machine, which is stored in a storage system, and manage a boot workload map and a boot segment; a cache device configured to cache the boot segment; and a prefetch manager configured to prefetch the boot segment from the cache device.

According to the present disclosure, in an environment in which a large-scale virtual machine is operated, data blocks initially randomly accessed in booting of the virtual machine are detected in advance and loaded in a cache, so that it is possible to improve the booting performance of the virtual machine and reduce the load of a storage system, caused by random reads.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
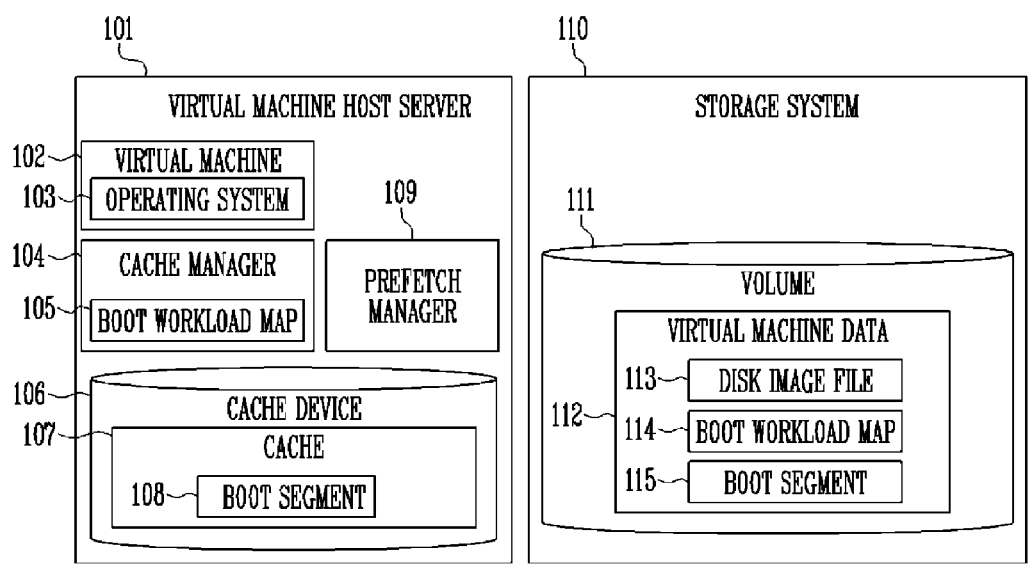
FIG. 1 is a diagram illustrating a virtual machine environment according to an embodiment of the present disclosure.

FIG. 1 is a diagram illustrating a virtual machine environment according to an embodiment of the present disclosure.

Referring to FIG. 1, the virtual machine environment according to the embodiment of the present disclosure is generally configured with a virtual machine host server 101 and a storage system 110.

The virtual machine host server 101 may include a virtual machine 102, a cache manager 104, a prefetch manager 109, and a cache device 106. Also, the storage system 110 may include one or more volumes 111.

A user's virtual machine 102 is executed in the virtual machine host server 101, and an operating system 103 is installed in the virtual machine 102. If a virtual machine 102 is installed in the virtual machine host server 101, and accordingly, virtual machine data 112 as data of the corresponding virtual machine 102 is generated and stored in a volume 111 of the storage system 110. According to the embodiment of the present disclosure, the virtual machine data 112 may include a disk image file 113, a boot workload map 114, and a boot segment 115.

If the virtual machine 102 is started, the operating system 103 installed in the virtual machine 102 starts booting, and reads necessary data from the disk image file 113 of the storage system 110. In this case, the cache manager 104 generates a new boot workload map 105 and tacks data blocks accessed in the booting of the operating system 103. If the booting of the operating system 103 is completed and the virtual machine 102 is terminated, the cache manager 104 generates a boot segment 108 by sequencing the data blocks accessed using the boot workload map 105 and then stores the generated boot segment 108 as a boot workload map 114 and a boot segment 115 in the volume 111 of the storage system 110.

After that, if the virtual machine is rebooted, the cache manager 104 loads the boot workload map 114 stored in the storage system 110 and transmits the loaded boot workload map 114 to the prefetch manager 109, thereby instructing prefetching. The prefetch manager 109 prefetches the boot segment 115 from the storage system 110, using the boot workload map 114, loads the prefetched boot segment 115 in a memory, and loads the loaded boot segment 115 in a cache 107 of the cache device 106. The cache manager 104 checks whether data blocks requested in the booting of the virtual machine 102 exist. When data blocks exist, the cache manager 104 reads the data blocks from the cache 107 and then returns the data blocks. Otherwise, the cache manager 104 reads data blocks from the disk image file 113 stored in the storage system 110 and then returns the data blocks.

Figure 2:
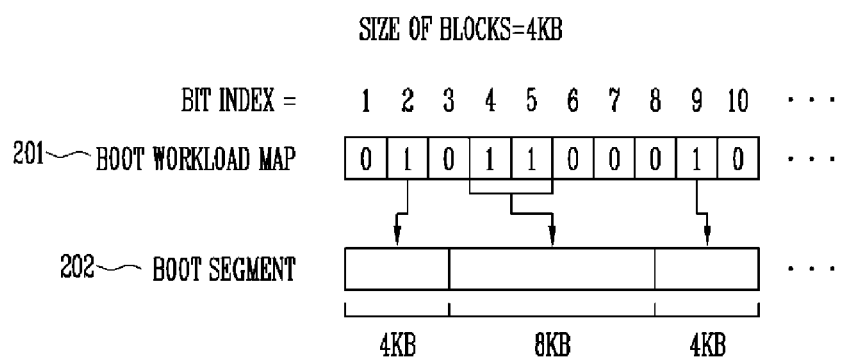
FIG. 2 is a diagram illustrating a structure of a boot workload map and a boot segment according to an embodiment of the present disclosure.

FIG. 2 is a diagram illustrating a structure of a boot workload map and a boot segment according to an embodiment of the present disclosure.

In FIG. 2, it is assumed that the size of blocks constituting the boot work load map is 4 KB. However, this is merely one embodiment, and the size of blocks constituting the boot workload map may be variously set.

The boot workload map 201 means a block bit map accessed in booting in the disk image file 113. In the boot workload map 201, first, third, fourth, and eighth bits set to "1" mean blocks accessed in the booting in the disk image file 113. That is, this means that, when the disk image file 113 is divided into blocks in a unit of 4 KB, second, fourth, fifth, and ninth 4 KB data blocks are accessed in the disk image file 113. The boot segment 202 represents a file in which the blocks set to "1" in the boot workload map 201 are sequenced and stored.

The prefetch manager 109 according to the embodiment of the present disclosure calculates an actual offset and a size in the disk image file 113 with respect to data stored in the boot segment 201, using the boot workload map 201, and stores the calculated offset and size in the cache through the cache manager 104. The cache manager 104 generates a new boot segment 202 by sequencing blocks accessed using the boot workload map 201.

Figure 3:
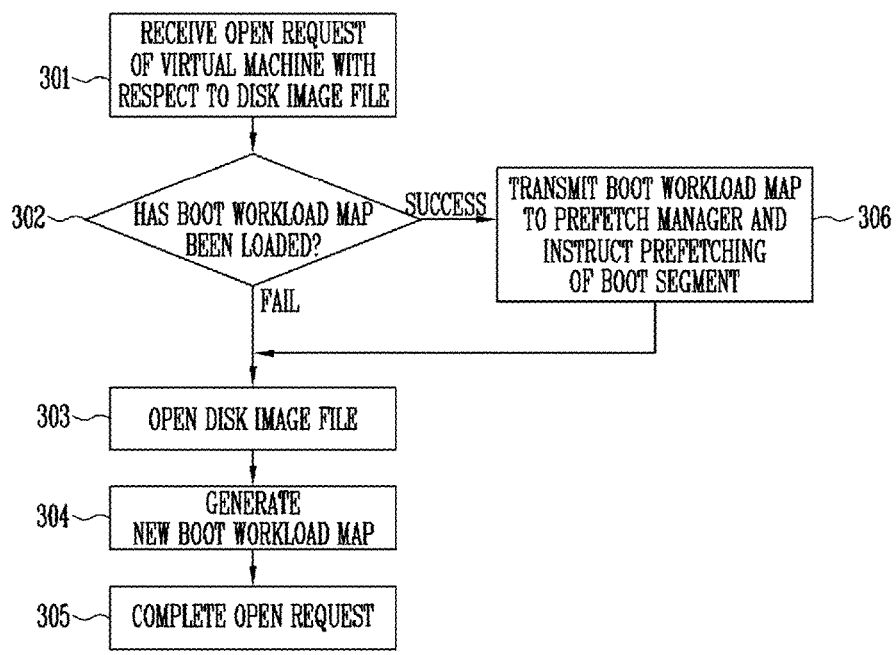
FIG. 3 is a flowchart illustrating a method in which a cache manager processes an open request for a disk image file of a virtual machine according to an embodiment of the present disclosure.

FIG. 3 is a flowchart illustrating a method in which the cache manager processes an open request for a disk image file of the virtual machine according to an embodiment of the present disclosure.

Referring to FIG. 3, in step 301, the cache manager 104 receives an open request of the virtual machine 102 with respect to a disk image file 113. After that, in step 302, the cache manager 104 attempts to load the boot workload map 114 from the storage system 110. When the cache manager 104 succeeds in loading the boot workload map 114 from the storage system in step 302, the cache manager 104 proceeds to step 306 to transmit the loaded boot workload map 105 to the prefetch manager 109 and instruct prefetching of the boot segment 115. After that, the cache manager 104 proceeds to step 303 to open the disk image file 113 and return a file identifier. When the cache manager 104 fails in loading the boot workload map 114 from the storage system 110 in step 302, the cache manager 104 immediately proceeds to step 303 to open the disk image file 113 and return the file identifier.

In step 304, the cache manager 104 generates a new boot workload map 105, and proceeds to step 305 to complete processing of the open request. The newly generated boot workload map 105 is used to perform a more accurate boot workload analysis whenever the virtual machine 102 is booted, and the generation of the boot workload map 105 may be differently applied according to policies. For example, the boot workload map 105 may be generated in every predetermined period or whenever a change in boot workload is expected due to an update of the operating system 103 of the virtual machine 102 or installation of an application program.

Figure 4:
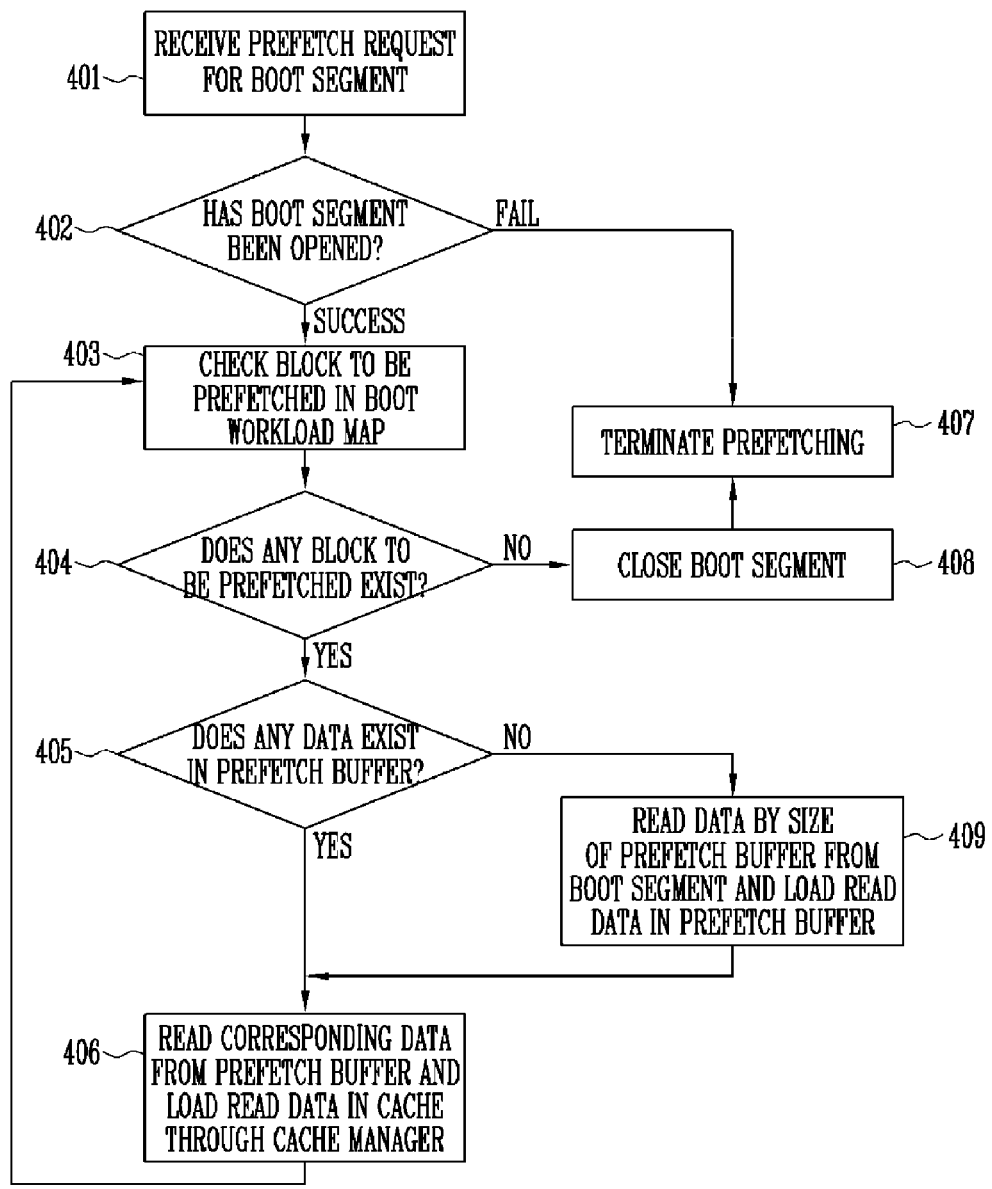
FIG. 4 is a flowchart illustrating a method in which a prefetch manager prefetches a boot segment and loads the prefetched boot segment in a cache according to an embodiment of the present disclosure.

FIG. 4 is a flowchart illustrating a method in which the prefetch manager prefetches a boot segment and loads the prefetched boot segment in the cache according to an embodiment of the present disclosure.

Referring to FIG. 4, in step 401, the prefetch manager 109 first receives a prefetch request from the cache manager 104. After that, in step 402, the prefetch manager 109 attempts to open the boot segment 115 in the storage system 110. When the prefetch manager 109 fails in opening the boot segment 115 due to a cause that the boot segment 115 does not exist, etc. in step 402, the prefetch manager 109 proceeds to step 407 to terminate prefetching.

When the prefetch manager 109 succeeds in opening the boot segment 115 in step 402, the prefetch manager 109 proceeds to step 403 to check blocks to be prefetched in the boot workload map 105 transmitted from the cache manager 105. According to the embodiment of the present disclosure, the cache manager 105 may check bits or bit strings having a bit value of "1" by comparing bit values of the boot workload map 105, calculate positions of data blocks in the boot segment, using order information of only the bits having the bit value of "1," and calculate a size of the data blocks, using the number of consecutive bits. Also, an actual offset in the disk image file 113 may be calculated using index values of the bits.

In step 404, the prefetch manager 109 determines whether any block to be prefetched exists. When the prefetch manager 109 determines that any block to be prefetched does not exist in step 404, the prefetch manager 109 proceeds to step 408 to close the boot segment 115, and proceeds to step 407 to terminate prefetching.

When the prefetch manager 109 determines that any block to be prefetched exists in step 404, the prefetch manager 109 proceeds to step 405 to check whether any data exists in a prefetch buffer. When any data does not exist in the prefetch buffer in step 405, the prefetch manager 109 proceeds to step 409 to read data by the size of the prefetch buffer from the boot segment 115 of the storage system 110 and load the read data in the prefetch buffer. After that, the prefetch manager 109 proceeds to step 406 to read the corresponding data from the prefetch buffer and store the read data in the cache 107 through the cache manager 104, using information on the calculated actual offset and size in the disk image file.

When any data exists in the prefetch buffer in step 405, the prefetch manager 109 immediately proceeds to step 406 to read the corresponding data from the prefetch buffer and store the read data in the cache 107 through the cache manager 104, using information on the calculated actual offset and size in the disk image file.

Further, the prefetch manager 109 repeatedly performs a test on blocks to be prefetched in the boot workload map until the prefetching is terminated.

Figure 5:
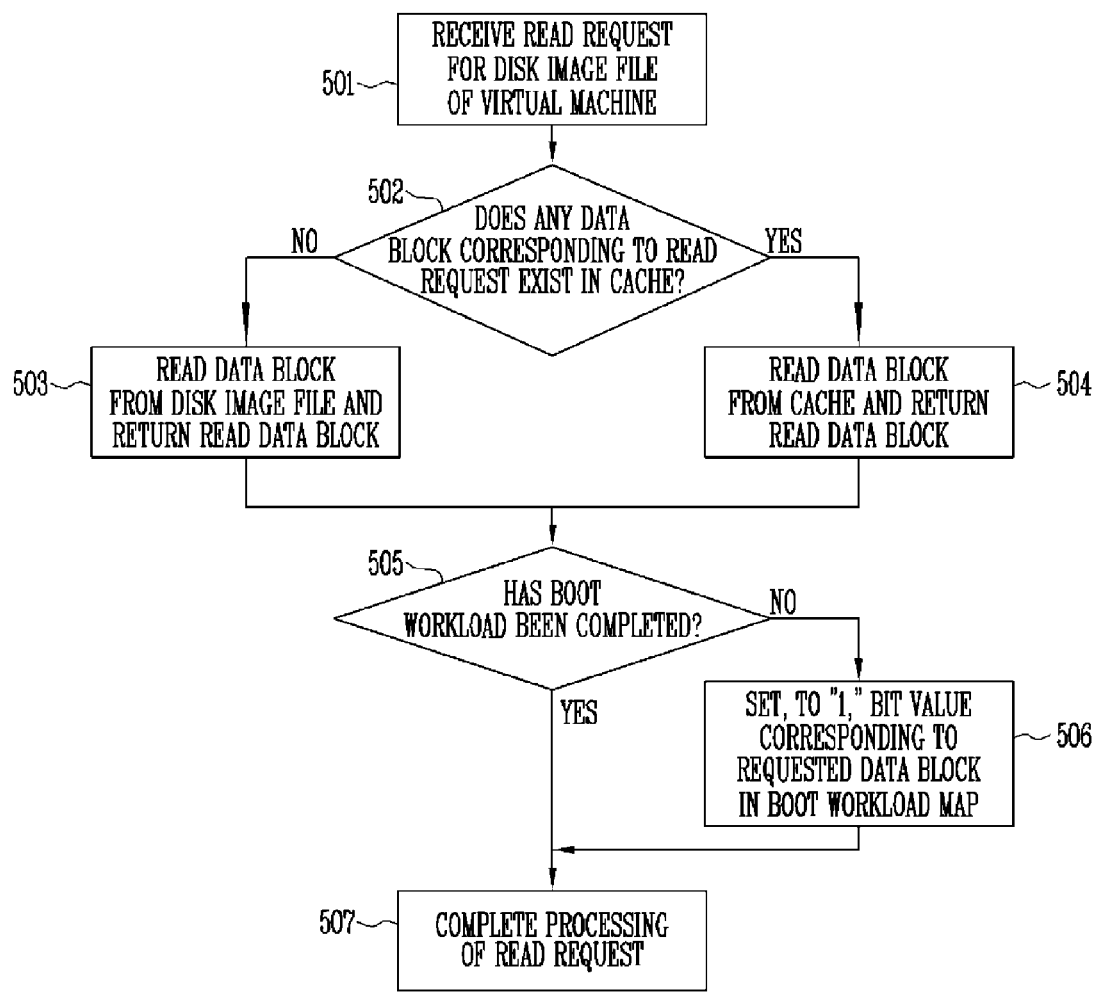
FIG. 5 is a flowchart illustrating a method in which the cache manager processes a read request for a disk image file of the virtual machine according to an embodiment of the present disclosure.

FIG. 5 is a flowchart illustrating a method in which the cache manager processes a read request for a disk image file of the virtual machine according to an embodiment of the present disclosure.

Referring to FIG. 5, in step 501, the cache manager 104 first receives a read request for a disk image file 113. In step 502, the cache manager 104 checks whether a data block corresponding to the read request exists in the cache 107. When a data block exists in the cache 107, the cache manager 104 proceeds to step 504 to read a data block from the cache 107 and return the read data block. Otherwise, the cache manager 104 proceeds to step 503 to read a data block from the disk image file 113 and return the read data block.

Next, in step 505, the cache manager 104 checks whether a boot workload has been completed. Whether the boot workload has been completed may be first determined by checking whether the accumulated size of data processed through the read request after disk image file is opened reaches a predetermined size. For example, in the case of Windows 7 that is one of operating systems of Microsoft, data of about 400 to 500 MB is read in booting of Windows 7. Hence, this may be used in Windows 7. Also, only about 33 MB that is the accumulated size may be set to the predetermined size by considering that about 68,000 random reads in a sector unit of 512 bytes are generated in an early period of the booting, and the number of 68,000 accumulated read requests may be used as a point of time when the booting is completed. Further, the time when a read request having a sector unit greater than 512 byte is transmitted may be set as a point of time when the booting is completed.

When the boot workload is not completed in step 505, cache manager 104 proceeds to step 506 to set, to "1," a bit value of a block corresponding to the read request in the boot workload map 105, and proceeds to step 507 to complete the processing of the read request. When the boot workload is completed in step 505, the cache manager 104 immediately proceeds to step 507 to complete the processing of the read request.

Figure 6:
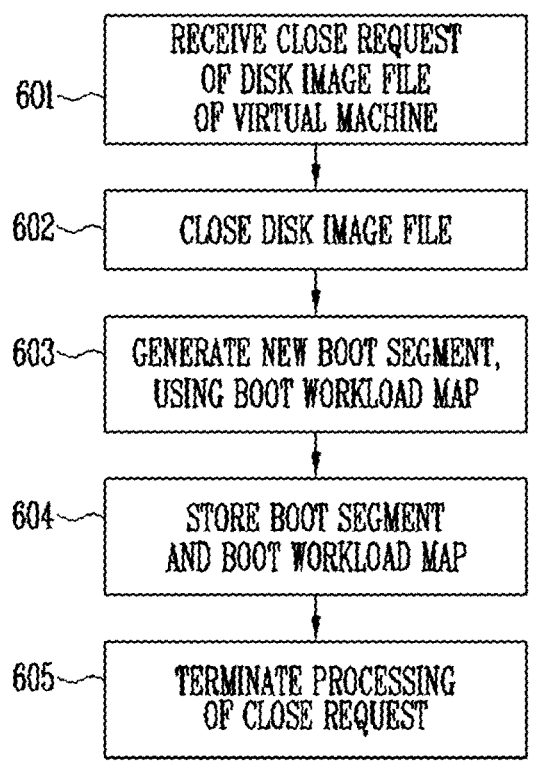
FIG. 6 is a flowchart illustrating a method in which the cache manager processes a close request for a disk image file of the virtual machine according to an embodiment of the present disclosure.

FIG. 6 is a flowchart illustrating a method in which the cache manager processes a close request for a disk image file of the virtual machine according to an embodiment of the present disclosure.

Referring to FIG. 6, in step 601, the cache manager 104 first receives a close request for the disk image file 113, and proceeds to step 602 to close the requested disk image file 113 and return a result. Thereafter, in step 603, the cache manager 104 generates a new boot segment 108, using a newly generated boot workload map 105 as a background, and proceeds to step 604 to store the generated boot workload map 105 and the generated boot segment 108 in the storage system 110. In step 605, the cache manager 104 terminates the processing of the close request. In this case, the generation of the new boot segment 108 and the storage in the storage system 110 may be performed after the cache manager 104 processes the read request and then checks whether the boot workload has been completed (step 505).

According to the present disclosure, in an environment in which a large-scale virtual machine is operated, data blocks initially randomly accessed in booting of the virtual machine are detected in advance and loaded in a cache, so that it is possible to improve the booting performance of the virtual machine and reduce the load of a storage system, caused by random reads.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A virtual machine host server, comprising:
   a virtual machine in which a guest operating system is installed and operated;
   a cache manager configured to process an open request, a close request, and an input and/or output request for a disk image file of the virtual machine, which is stored in a storage system, and to manage a boot workload map and a boot segment;
   a cache device configured to cache the boot segment; and
   a prefetch manager configured to prefetch the boot segment from the cache device,
   wherein, when the cache manager instructs the prefetch manager to prefetch a boot workload map, the prefetch manager configured to open a boot segment of the storage system, to check blocks to be prefetched in the boot workload map transmitted from the cache manager, to determine whether any block to be prefetched does not exist, and to terminate prefetching when it is determined that any block to be prefetched does not exist, wherein, when any block to be prefetched exist, the prefetch manager configured to check a storage space of a prefetch buffer, to load data in the prefetch buffer by prefetching a boot segment through consecutive reads each having a predetermined size from the storage system when any storage space exists in the prefetch buffer to calculate a position of the corresponding block in the boot segment using an order of bits set as a block accessed in booting in the boot workload map and a number of bit strings, to calculate an actual offset of the corresponding block in the disk image file of the virtual machine using the boot workload map, to read a block to be prefetched from the prefetch buffer and loads the read block in a cache through the cache manager, and to close the boot segment.

2. The virtual machine host server of claim 1, wherein, when the cache manger receives a read request for a disk image file of the virtual machine, the cache manager configured to check whether any data block corresponding to the read request exists in the cache device, when the data block corresponding to the read request exists in the cache device, the cache manager configured to process the data block corresponding to the read request using the cache device or the storage system, to determine a point of time when a boot workload is completed and to set the data block corresponding to the read request in a boot workload map.

3. The virtual machine host server of claim 1, wherein, when the cache manager receives the close request for a disk image file of the virtual machine, the cache manager configured to close the disk image file of the virtual machine, to generate a new boot segment using a boot workload map and to store the new boot segment and the boot workload map in the storage system.

4. The virtual machine host server of claim 1, wherein the boot workload map is a block bitmap file in which blocks are divided into blocks accessed in the booting and blocks not accessed in the booting and then stored.

5. The virtual machine host server of claim 1, wherein the boot segment is a file in which data randomly accessed in the booting are sequenced and then stored.

6. The virtual machine host server of claim 1, wherein the storage system stores data of the virtual machine included in the virtual machine host server, and wherein the data includes at least one of a disk image file of the virtual machine, a boot workload map of the virtual machine, and a boot segment of the virtual machine.

* * * * *